(12) United States Patent
Radtke et al.

(10) Patent No.: US 11,672,196 B2
(45) Date of Patent: Jun. 13, 2023

(54) SEED DELIVERY APPARATUS

(71) Applicant: Precision Planting LLC, Tremont, IL (US)

(72) Inventors: Ian Radtke, Washington, IL (US); Kent Levy, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 201 days.

(21) Appl. No.: 16/461,237

(22) PCT Filed: Nov. 1, 2017

(86) PCT No.: PCT/US2017/059584
§ 371 (c)(1),
(2) Date: May 16, 2019

(87) PCT Pub. No.: WO2018/093568
PCT Pub. Date: May 24, 2018

(65) Prior Publication Data
US 2019/0364724 A1 Dec. 5, 2019

Related U.S. Application Data

(60) Provisional application No. 62/423,105, filed on Nov. 16, 2016.

(51) Int. Cl.
*A01C 7/18* (2006.01)
*A01C 7/04* (2006.01)
(Continued)

(52) U.S. Cl.
CPC .................. *A01C 7/18* (2013.01); *A01C 7/04* (2013.01); *A01C 7/124* (2013.01); *A01C 7/16* (2013.01); *A01C 7/20* (2013.01); *A01C 7/206* (2013.01)

(58) Field of Classification Search
CPC ........... A01C 7/04; A01C 7/123; A01C 7/124; A01C 7/16; A01C 7/18; A01C 7/20; A01C 7/206
See application file for complete search history.

(56) References Cited

U.S. PATENT DOCUMENTS 148,592 A * 3/1874 Brown ...................... A01C 7/18
111/51
2,885,978 A * 5/1959 Miller ..................... A01C 5/062
111/149
(Continued)

FOREIGN PATENT DOCUMENTS

EP 3 050 419 A1 8/2016
KR 19990033608 A * 5/1991 ............... A01G 9/02
(Continued)

OTHER PUBLICATIONS

Seamster, "Tabletop Pinball", published as early as 2009 based on comments, Instructables Living, https://www.instructables.com/Pinball/ (Year: 2009).*

(Continued)

*Primary Examiner* — Thomas B Will
*Assistant Examiner* — Ian A Normile

(57) ABSTRACT

A seed conveyor assembly that delivers seed to a planting surface in a controlled manner to maintain seed placement accuracy within a trench. In one embodiment, a seed guide for a seed conveyor assembly includes a relief portion and an introduction portion that includes at least one protrusion. The protrusion is angled from a side of the introduction portion toward the center of the introduction portion. The end of the protrusion is proximate the center of the introduction portion being further from the relief portion.

18 Claims, 19 Drawing Sheets

(51) Int. Cl.
*A01C 7/16* (2006.01)
*A01C 7/20* (2006.01)
*A01C 7/12* (2006.01)

(56) References Cited

U.S. PATENT DOCUMENTS

| | | | | |
|---|---|---|---|---|
| 3,176,636 | A | 4/1965 | Wilcox | |
| 4,489,892 | A * | 12/1984 | Tyler | A01C 15/04 239/650 |
| 4,826,088 | A * | 5/1989 | Balmer | B05B 1/14 239/523 |
| 4,971,255 | A * | 11/1990 | Conrad | A01C 7/16 239/553.3 |
| 5,522,328 | A * | 6/1996 | Long | A01C 7/082 111/176 |
| 5,664,506 | A * | 9/1997 | Morin | A01C 7/02 111/200 |
| 6,213,690 | B1 * | 4/2001 | Gregor | A01C 7/125 406/182 |
| 6,389,999 | B1 | 5/2002 | Duello | |
| 7,343,868 | B2 * | 3/2008 | Stephens | A01C 7/20 111/178 |
| 7,438,006 | B2 | 10/2008 | Mariman et al. | |
| 8,985,037 | B2 | 3/2015 | Radtke et al. | |
| 9,043,950 | B2 * | 6/2015 | Wendte | A01C 7/102 |
| 2002/0050238 | A1 | 5/2002 | Crabb et al. | |
| 2013/0192504 | A1 | 8/2013 | Sauder et al. | |
| 2014/0174199 | A1 | 6/2014 | Strnad et al. | |
| 2014/0230705 | A1 | 8/2014 | Radtke | |
| 2015/0223392 | A1 * | 8/2015 | Wilhelmi | A01C 7/206 111/171 |
| 2016/0212932 | A1 | 7/2016 | Radtke | |

FOREIGN PATENT DOCUMENTS

| | | | | |
|---|---|---|---|---|
| RU | 2233574 C2 | 8/2004 | | |
| WO | WO-2010044724 A1 * | 4/2010 | | A01C 15/04 |
| WO | 2012/015957 A1 | 2/2012 | | |
| WO | 2013/049198 A1 | 4/2013 | | |
| WO | 2017/011675 A1 | 1/2017 | | |

OTHER PUBLICATIONS

The Crafty Crow, "Peg Board Marble Run DIY", Oct. 8, 2012, https://www.thecraftycrow.net/2012/10/peg-board-marble-run-diy.html (Year: 2012).*

US Patent and Trademark Receiving Office, International Search Report for International Application No. Application No. PCT/US2017/059584, dated Feb. 2, 2018.

European Patent Office, Search Report for related European Application No. EP 17 87 1268, dated Nov. 9, 2020.

Russian FIPS Department of Biotechnology, Agriculture and Food Industry; Search Report for related Russian Application dated Feb. 18, 2021.

* cited by examiner

SEED DELIVERY APPARATUS

RELATED APPLICATIONS

This application claims the benefit of U.S. Provisional Application No. 62/423,105, filed on Nov. 16, 2016 entitled: SEED DELIVERY APPARATUS, which is incorporated by reference herein.

TECHNICAL FIELD

The present disclosure pertains to the field of agricultural operations including a seed delivery apparatus in which a seed conveyor delivers seed from a metering device to a trench in a controlled manner to maintain seed placement accuracy within the trench.

BACKGROUND

In recent years, the agricultural industry has recognized the need to perform planting operations more quickly due to the limited time during which such planting operations are agronomically preferable or (in some growing seasons) even possible due to inclement weather. However, drawing a planting implement through the field at faster speeds increases the speed of deposited seeds relative to the ground, causing seeds to roll and bounce upon landing in the trench and resulting in inconsistent plant spacing. The adverse agronomic effects of poor seed placement and inconsistent plant spacing are well known in the art.

As such, there is a need for apparatus, systems and methods of effectively delivering seed to the trench while maintaining seed placement accuracy at both low and high implement speeds.

BRIEF DESCRIPTION OF THE DRAWINGS

The present disclosure is illustrated by way of example, and not by way of limitation, in the figures of the accompanying drawings and in which.

BRIEF SUMMARY

The present disclosure pertains to the field of agricultural operations including a seed delivery apparatus in which a seed conveyor delivers seed from a metering device to a trench in a controlled manner to maintain seed placement accuracy within the trench.

In one embodiment, a seed guide for a seed tube includes a relief portion and an introduction portion that includes at least one protrusion. The protrusion is angled from a side of the introduction portion toward the center of the introduction portion. A second end of the protrusion is proximate the center of the introduction portion being further from the relief portion than a first end of the protrusion.

DETAILED DESCRIPTION

Figure 1:
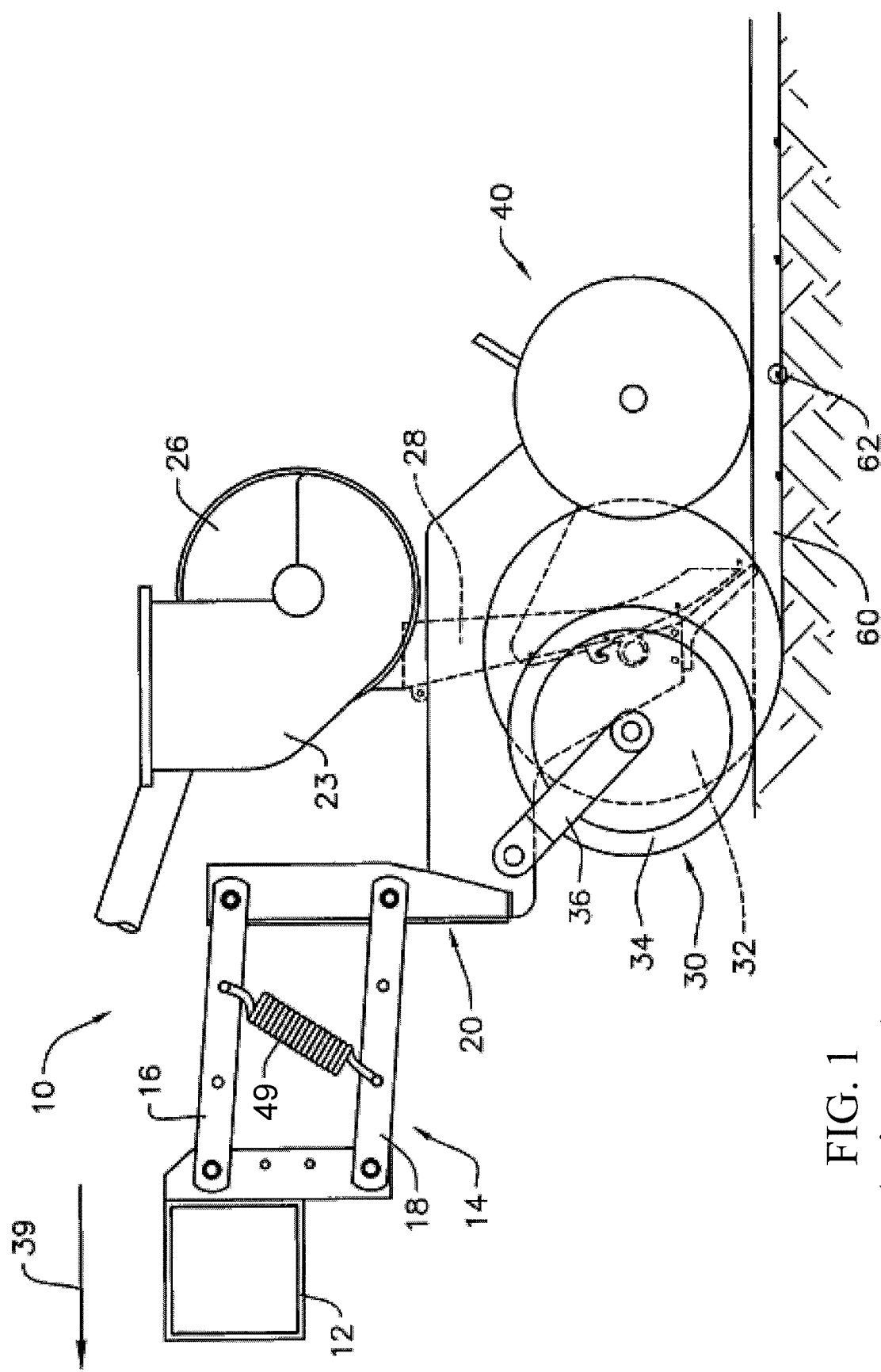
FIG. 1 is a side elevation view of a prior art row unit of an agricultural row crop planter.

Referring now to the drawings, wherein like reference numerals designate identical or corresponding parts throughout the several views, FIG. 1 illustrates a side elevation view of a single row unit 10 of a conventional row crop planter such as the type disclosed in U.S. Pat. No. 7,438,006, the disclosure of which is hereby incorporated herein in its entirety by reference. As is well known in the art, the row units 10 are mounted in spaced relation along the length of a transverse toolbar 12 by a parallel linkage 14, comprised of upper and lower parallel arms 16, 18 pivotally mounted at their forward ends to the transverse toolbar 12 and at their rearward end to the row unit frame 20. The parallel linkage 14 permits each row unit 10 to move vertically independently of the toolbar 12 and the other spaced row units in order to accommodate changes in terrain or rocks or other obstructions encountered by the row unit as the planter is drawn through the field.

The row unit frame 20 operably supports a seed hopper 23, which may be adapted to receive seed from a bulk hopper (not shown), a seed meter 26, and a seed tube 28, as well as a seed trench or seed furrow opener assembly 30, and trench or furrow closing assembly 40. The trench opener assembly 30 comprises a pair of trench opener discs 32 and a pair of gauge wheels 34. The gauge wheels 34 are pivotally secured to the row unit frame 20 by gauge wheel arms 36. A coil spring 49 is disposed between the parallel arms 16, 18 to provide supplemental downforce to ensure that the trench opener discs 32 fully penetrate the soil to the desired depth as set by a depth adjusting member (not shown) and to provide soil compaction for proper trench formation. Rather than a coil spring, supplemental downforce may be provided by actuators or other suitable means such as disclosed in U.S. Pat. No. 6,389,999 to Duello, the entire disclosure of which is hereby incorporated herein by reference.

In operation, as the row unit 10 is lowered to the planting position, the opener discs 32 penetrate into the soil. At the same time, the soil forces the gauge wheels 34 to pivot upwardly until the gauge wheel arms 36 abut or come into contact with the stop position previously set with the trench depth adjusting member (not shown) or until a static load balance is achieved between the vertical load of the row unit and the reaction of the soil. As the planter is drawn forwardly in the direction indicated by arrow 39, the trench opener discs cut a V-shaped trench or furrow 60 into the soil while the gauge wheels 34 compact the soil to aid in formation of the V-shaped trench. Individual seeds 62 from the seed hopper 23 are dispensed by the seed meter 26 into an upper opening in the seed tube 28 in uniformly spaced increments. As seeds 62 fall through the seed tube 28, the seeds move downwardly and rearwardly between the trench opener discs 32 and into the bottom of the V-shaped trench 60. The trench 60 is then covered with soil and lightly compacted by the trench closing assembly 40.

It should be appreciated that because seeds 62 fall freely through the seed tube 28 in the row unit 10 described above, the path of travel of the seeds and the velocity of the seeds at the exit of the seed tube are relatively unconstrained. It would be preferable to constrain the path of travel of seeds 62 in order to reduce errors in spacing between seeds; i.e., placing seeds in the field at non-uniform spacing. Additionally, it would be preferable to control the velocity of seeds 62 such that the seeds have a decreased horizontal velocity relative to the ground upon landing in the trench 60.

Figure 2:
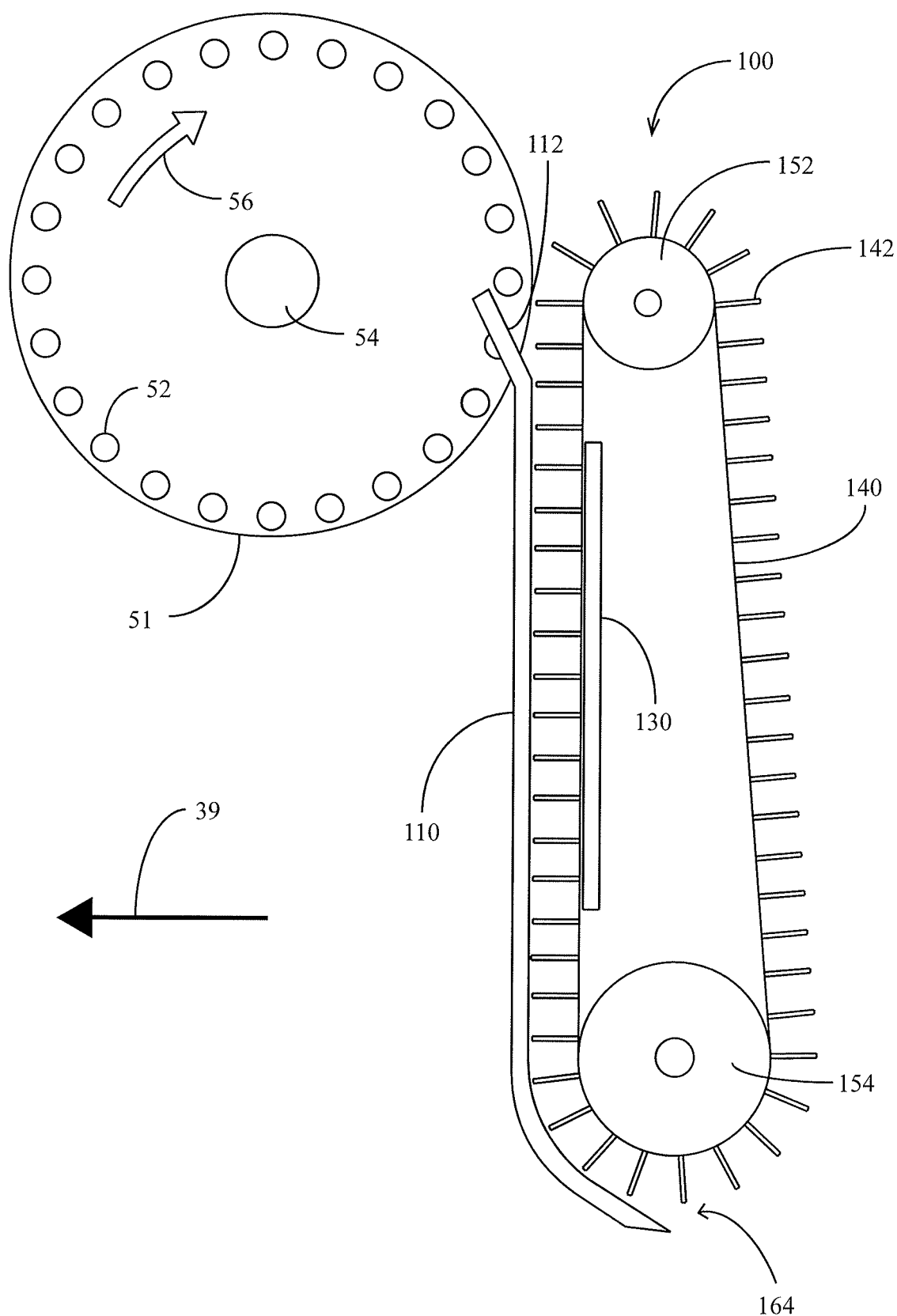
FIG. 2 is a side elevation view of an embodiment of a seed conveyor in cooperation with a seed disc.

A seed conveyor 100 is illustrated in FIG. 2. Examples of seed conveyors that can be used can be found in U.S. Pat. No. 8,985,037, US20160212932, and PCT Application No. PCT/US2016/042309, all of which are incorporated herein by reference in their entireties. The seed conveyor 100 includes a belt 140 disposed around upper and lower pulleys 152,154 and preferably driven by the upper pulley 152; in other embodiments the seed conveyor may be driven by the lower pulley 154. The belt 140 includes flights 142. The seed conveyor 100 additionally includes a guide surface 110 disposed adjacent to the flights 142 on one side of the seed conveyor. The seed conveyor 100 preferably includes a backing plate 130 disposed to maintain the position of belt 140.

Figure 3:
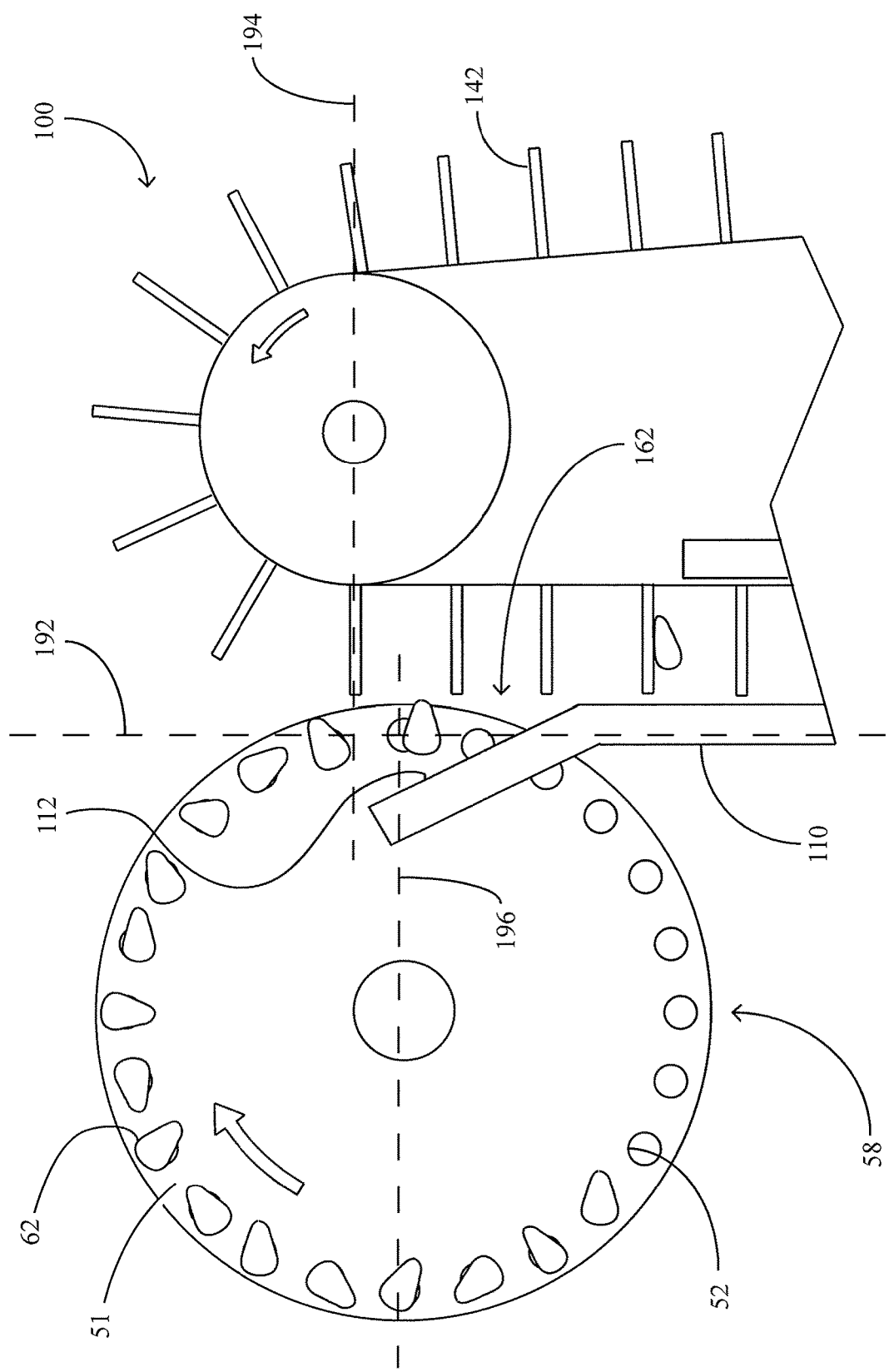
FIG. 3 is a partial side elevation view of an embodiment of a seed conveyor in cooperation with a seed disc.

In operation, the seed conveyor 100 receives seeds 62 from a seed disc 51 and conveys them to an exit 164. The seed disc 51 is preferably housed in a seed meter 26 similar to that illustrated in FIG. 1 and rotates in a direction indicated by arrow 56 about a shaft 54 rotatably mounted in the seed meter. Turning to FIG. 3, the seed meter 26 is preferably of the vacuum type as is known in the art, such that a vacuum source (not shown) creates a vacuum behind the seed disc 51 (as viewed in FIG. 3), thus creating a pressure differential across apertures 52 in the disc. As the apertures 52 rotate past a pool of seeds in the location generally indicated by reference numeral 58, the pressure differential causes individual seeds 62 to become entrained on each aperture 52 such that the seeds are carried by the disc as illustrated. As the apertures cross a boundary such as axis 196, preferably at approximately the 3 o'clock position of the seed disc 51, the vacuum source is substantially cut off (e.g., by termination of a vacuum seal as is known in the art) such that the seeds 62 are released from the disc as they cross axis 196. Seeds 62 preferably fall from the disc in a substantially vertical fashion along an axis 192. Guide surface 110 includes an angled portion 112, along which each seed 62 slides downward and rearward before passing between two flights 142 at a seed inlet generally indicated by reference numeral 162. Each seed 62 is then conveyed downward by seed conveyor 100.

Figure 4:
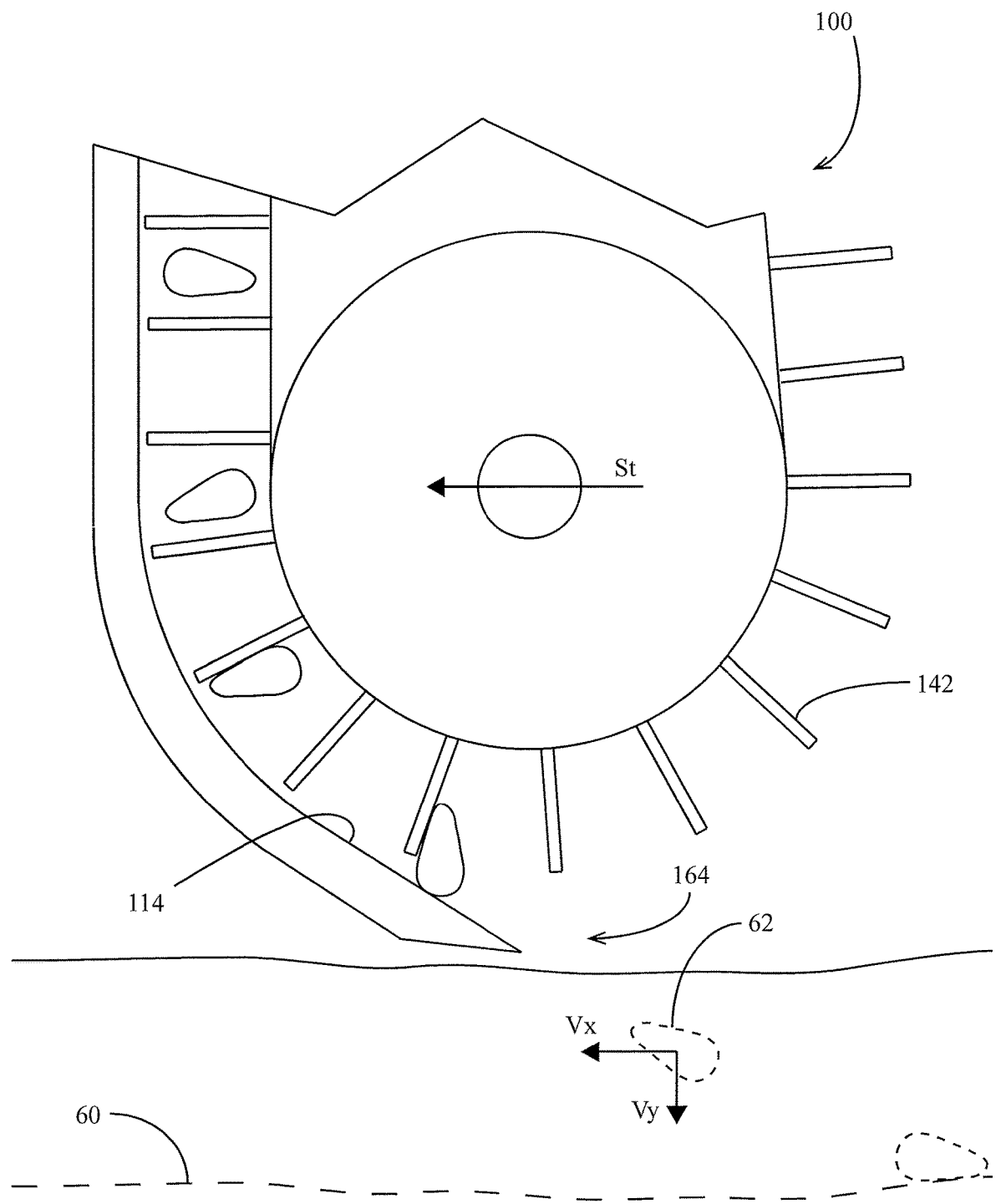
FIG. 4 is a partial side elevation view of an embodiment of a seed conveyor depositing seeds in a seed trench.

The belt 142 is preferably driven at a speed proportional to the groundspeed of the row unit 10 designated by reference "St" (FIG. 4). For example, in some embodiments the seed conveyor 100 is driven such that the linear speed of belt 142 at the bottom of the lower pulley 154 is approximately equal to the groundspeed St.

As illustrated in FIG. 3, each seed 62 is initially accelerated downward by the flight 142 above the seed. Turning to FIG. 4, as each seed 62 moves downward along the seed conveyor 100, it may fall away from the flight 142 above it. However, as each seed 62 nears the bottom of the seed conveyor, the flights 142 accelerate in order to travel around lower pulley 154 such that the flights 142 contact the seed and impart a rearward horizontal velocity to the seed. Additionally, an angled portion 114 of the guide surface 110 guides the seed rearward, imparting a rearward horizontal velocity to the seed. Thus, as the seed 62 exits the seed conveyor at a seed exit generally indicated by reference numeral 164, the seed has a downward vertical velocity component Vy and a horizontal velocity component Vx, the magnitude of which is less than the speed of travel St of the row unit 10. It should be appreciated that a smaller horizontal velocity component Vx is preferable because the seed 62 will experience less fore-aft roll as it lands in the trench 60, leading to more uniform seed placement. The angled portion 114 preferably is disposed 20 degrees below horizontal.

Returning to FIG. 3, it should be appreciated that flights 142 travel faster as they travel around the upper end of upper pulley 152, e.g., above an axis 194. Additionally, the flights 142 have a substantial horizontal velocity component above axis 194. As a result, attempting to introduce seeds 62 between the flights above axis 194 may result in seeds being knocked away from the belt 140. Thus, the seed inlet 162 at which seeds 62 pass between flights 142 is preferably below the axis 194. This result is preferably accomplished by positioning of the axis 196 at which seeds are released from the disc 51 below the axis 194 and/or by configuring angled portion 112 of guide surface such that seeds 62 slide below axis 194 before entering the inlet 162.

Figure 8:
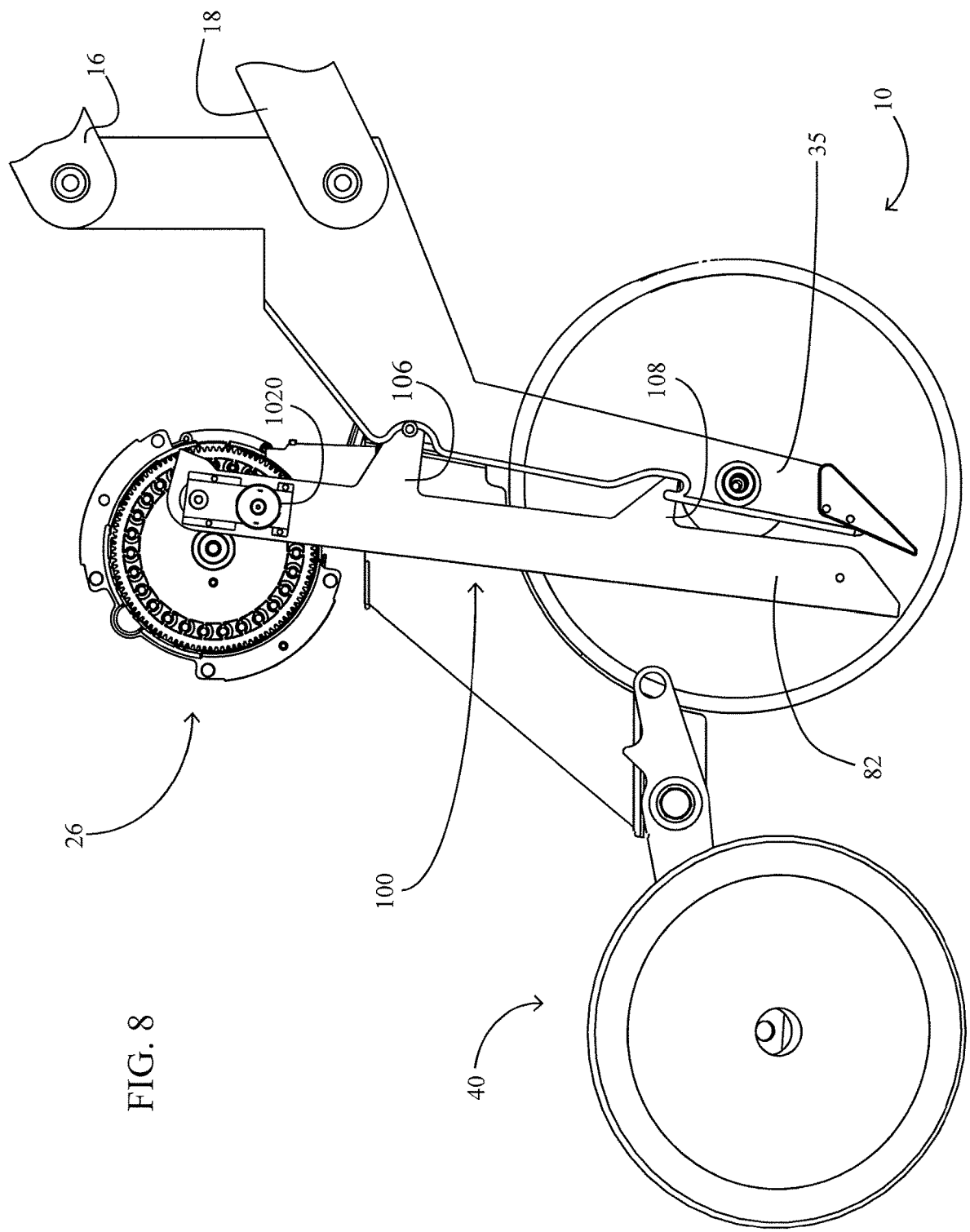
FIG. 8 is a side elevation view of an embodiment of a planter row unit in cooperation with an embodiment of a seed conveyor.

Turning to the embodiment of FIG. 8, a seed conveyor 100 is illustrated in cooperation with a row unit 10. The row unit 10 includes a shank portion 35. The seed conveyor 100 is mounted to the shank portion 35 by attachment ears 106,108.

Conveyor Control Systems and Methods

Figure 5:
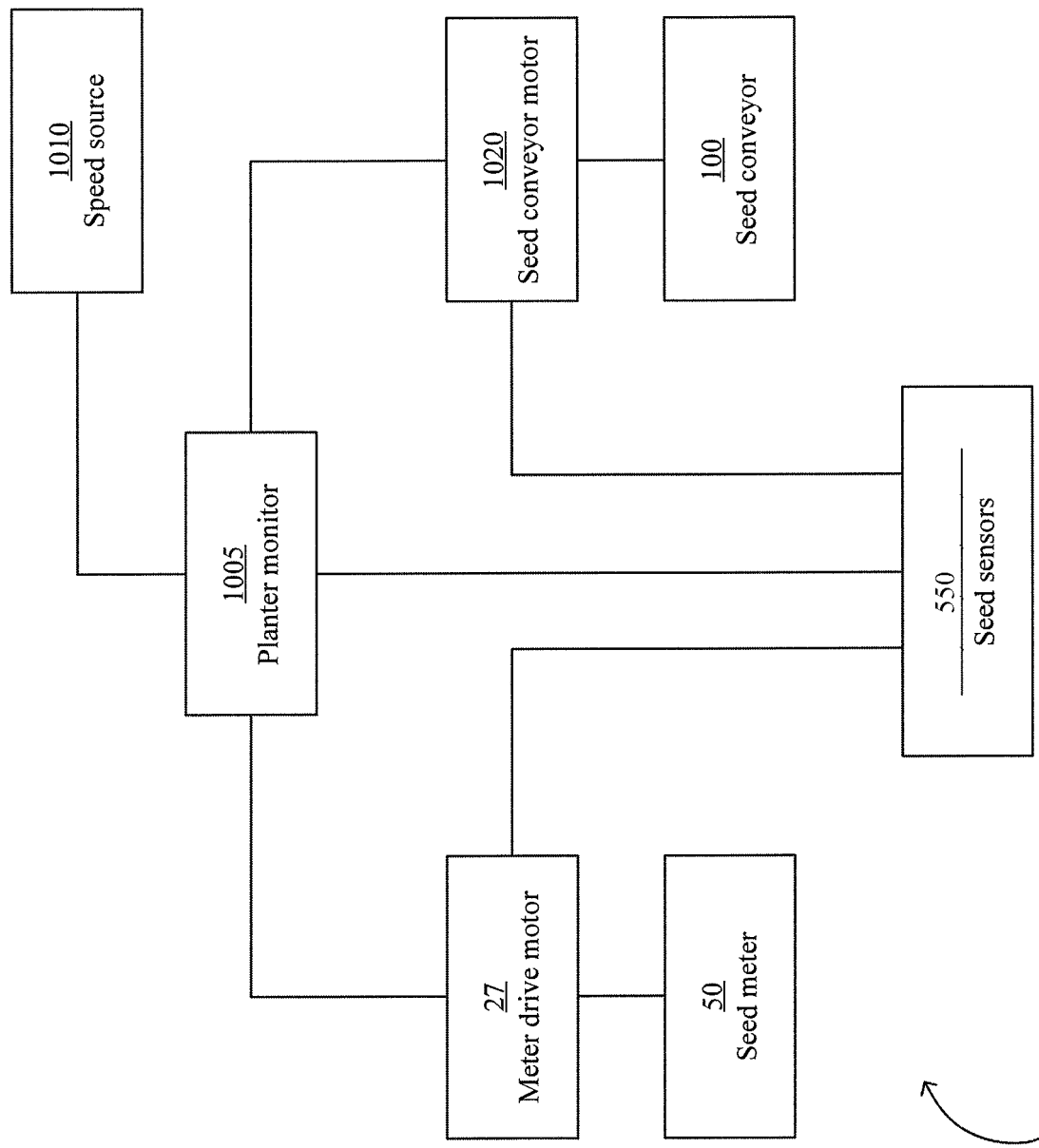
FIG. 5 is a schematic illustration of an embodiment of a seed conveyor control system.

A control system 1000 for controlling and monitoring the seed conveyor 100 as well as any other seed conveyor embodiment disclosed herein is illustrated schematically in FIG. 5. The control system 1000 includes a planter monitor 1005. The planter monitor 1005 preferably includes a CPU and user interface, and may comprise a monitor such as that disclosed in Applicant's U.S. Pat. No. 8,078,367. The planter monitor 1005 is preferably in electrical communication with a seed conveyor motor 1020. The seed conveyor motor 1020 is operably coupled to the seed conveyor 100 to drive the seed conveyor. For example, in some embodiments the seed conveyor motor 1020 includes a driven output shaft mechanically coupled to a central shaft of the upper pulley 154 or the lower pulley 152. The seed conveyor 1020 preferably includes an encoder (e.g., a hall-effect sensor) for sensing the rotational speed of the conveyor 100. The planter monitor 1005 is preferably in electrical communication with a meter drive motor 27. The meter drive motor 27 may comprise any apparatus known in the art for driving seed meters at a desired speed such as a hydraulic drive or electric drive. As an example, the meter drive motor 27 may comprise an electric motor mounted on or near the seed meter 26, the electric motor having an output shaft operably coupled to the shaft 54 of the seed meter; in such an embodiment, the meter drive motor 27 preferably includes an encoder (e.g., a hall-effect sensor) for sensing the rotational speed of meter 50. The planter monitor 1005 is also preferably in electrical communication with a speed source 1010. The speed source may comprise a GPS system, a radar speed sensor, or a wheel speed sensor. The planter monitor may choose between multiple speed sources by predicting reliability as disclosed in Applicant's International Patent Publication No. WO2012/015957, incorporated herein in its entirety by reference.

Continuing to refer to FIG. 5, the planter monitor is preferably in electrical communication with one or more seed sensors adapted for mounting to the seed conveyor 100. The seed sensors may comprise one or more seed sensors. The seed sensors may also be in electrical communication with the meter drive motor 27 and the seed conveyor motor 1020.

Figure 16:
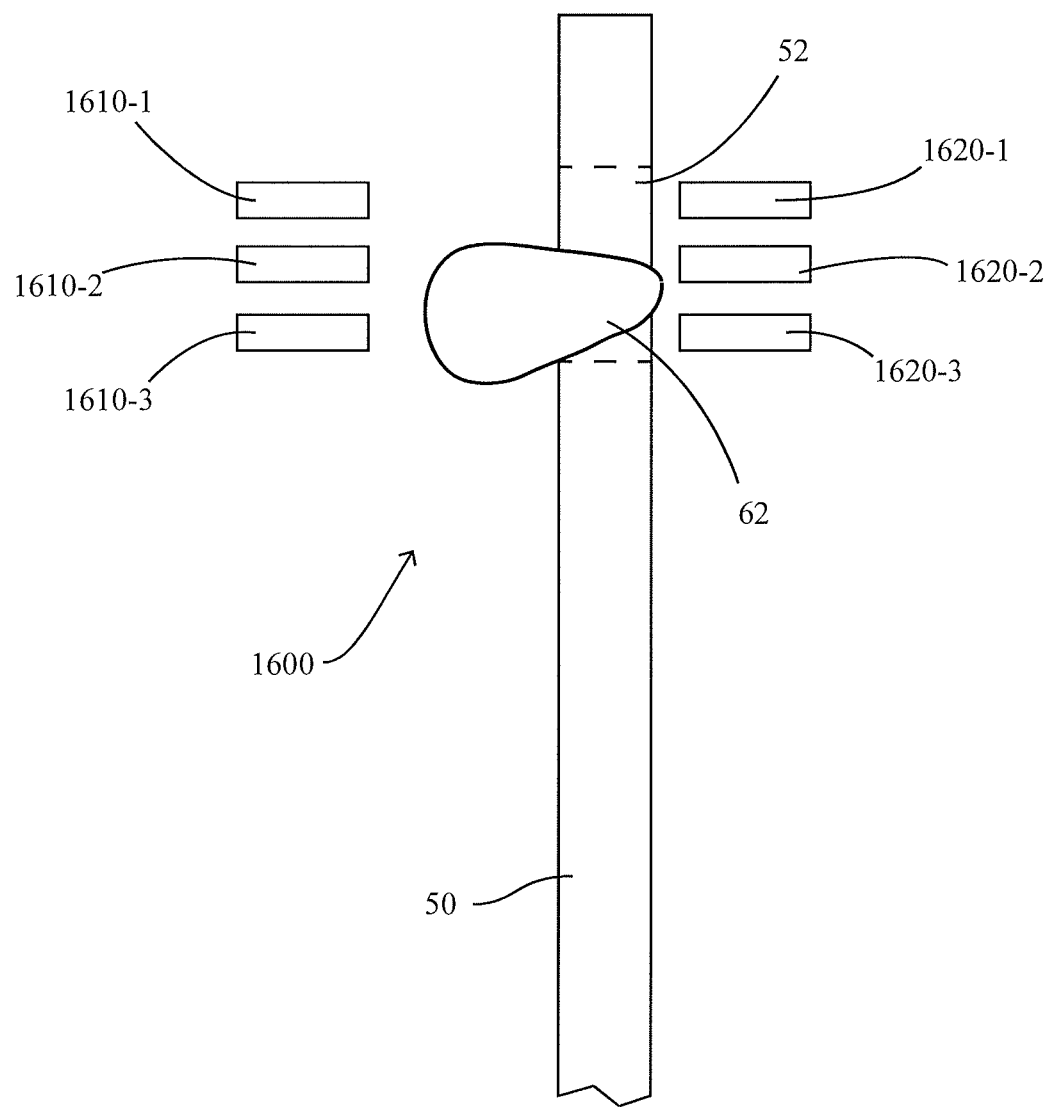
FIG. 16 is an elevation view of an embodiment of a seed sensor.

FIG. 16 shows an embodiment of a seed sensor 1600 comprising a plurality of transmitters 1610-1, 1610-2, and 1610-3 transmitting to an associated plurality of receivers 1620-1, 1620-2, and 1620-3. To determine whether there is a seed 62 in seed aperture 52, the signals received at the plurality of receivers can be averaged. Alternatively, the percent transmittance between each pair of transmitter and receiver can be measured and then weighted based on the percent transmittance and then the weighted results can be averaged. This can be useful when a seed is oriented in seed aperture 52 such that the seed 62 does not obstruct all of the plurality of transmitters 1610-1, 1610-2, and 1610-3 and receivers 1620-1, 1620-2, and 1620-3 at the same time. Having a plurality of sensors allows for better determination of whether there is a seed 62 in seed aperture 52.

Figure 6:
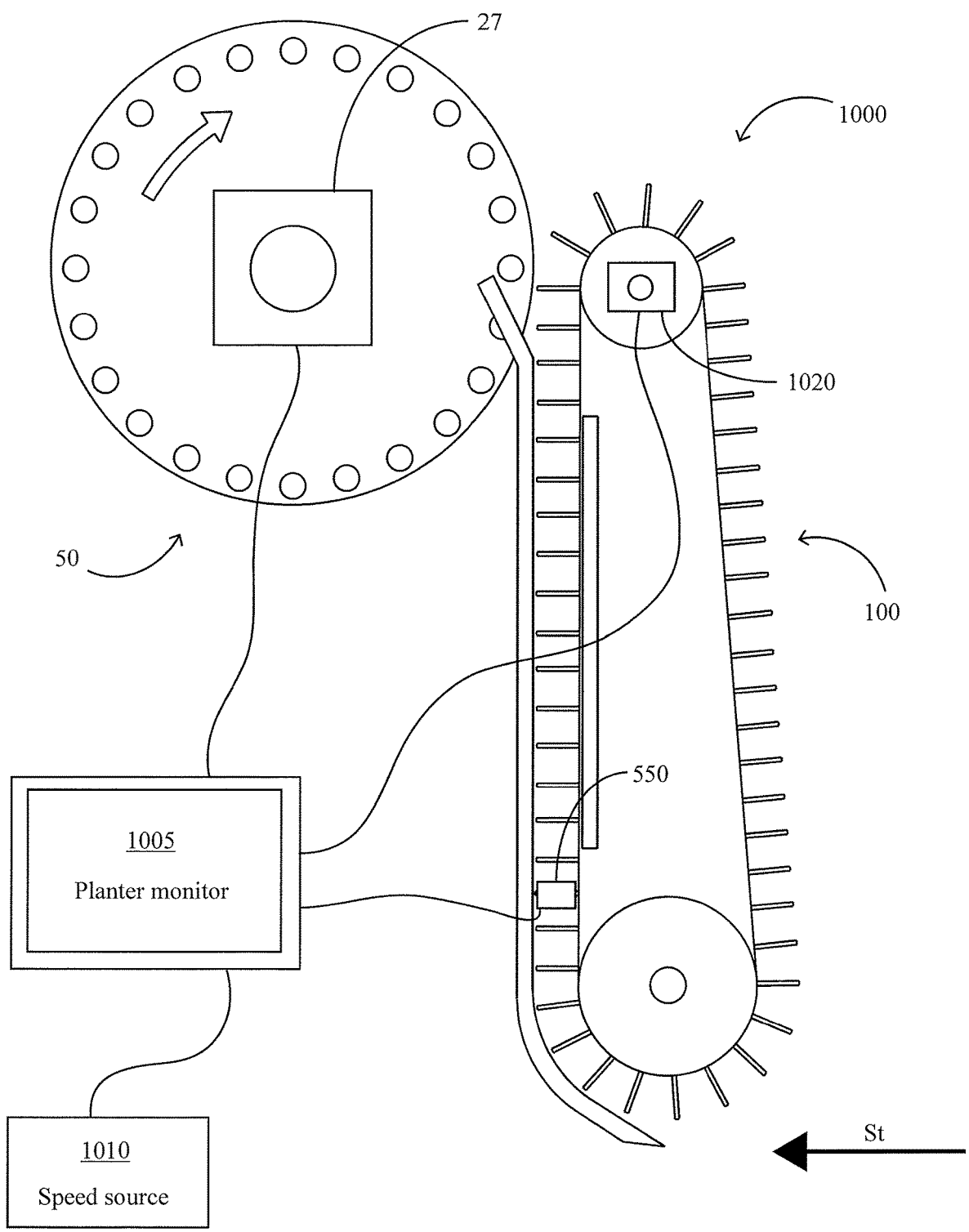
FIG. 6 illustrates an embodiment of a seed conveyor control system.

Turning to FIG. 6, one embodiment of a planter monitor control system 1000 is illustrated. The planter monitor control system 1000 of FIG. 6 includes a seed sensor 550 mounted to the sidewalls of the seed conveyor 100. The meter drive motor 27 in the planter monitor control system 1000 of FIG. 6 comprises an electric drive. The speed St of seed conveyor 100 is generally to the left along the perspective of FIG. 6 and has a magnitude which varies with the speed and direction of the planting implement.

Figure 7:
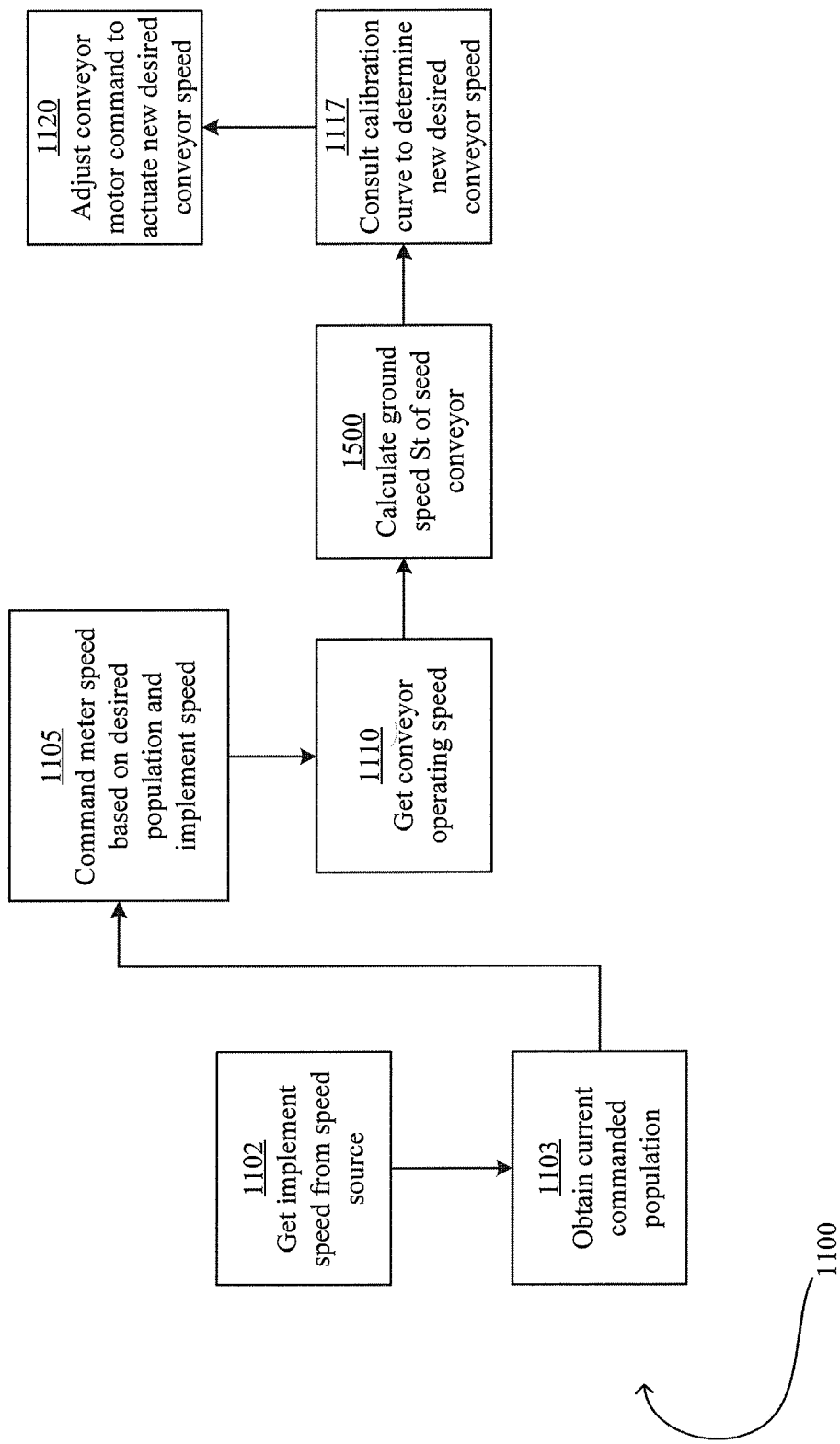
FIG. 7 illustrates an embodiment of a process for controlling a seed conveyor.

A process 1100 for controlling the rotational speed of the seed conveyor 100 is illustrated in FIG. 7. At block 1102 the planter monitor 1005 obtains a speed of the planting implement from the speed source 1010. At block 1103, the planter monitor 1005 preferably obtains the current commanded planting population (i.e., the number of desired seeds planted per acre) from a memory contained within the planter monitor 1005. At block 1105, the planter monitor 1005 preferably commands a rotational speed of meter 50 based on the desired population and the current implement speed.

Continuing to refer to FIG. 7, at block 1110, the planter monitor 1005 preferably determines an operating speed of the seed conveyor 100. This step may be accomplished using a Hall-effect or other sensor adapted to measure the driving speed of the electric motor or the rotational speed of the driven shaft of the seed conveyor 100. This step may also be accomplished by measuring the time between flights 142 passing the seed sensor 550. It should be appreciated in light of the instant disclosure that step of block 1110 does not require measuring an actual operational speed but may comprise measuring a criterion related to the operational speed.

Continuing to refer to FIG. 7, at block 1500 the planter monitor 1005 preferably determines the ground speed St of the seed conveyor 100. In some embodiments, this step may be accomplished by assuming that the tractor or implement speed reported by the speed source 1010 is equal to the ground speed St of the seed conveyor 100. Such a method is accurate when the tractor and toolbar 12 are not turning, but becomes inaccurate when the tractor and toolbar 12 are turning. In other embodiments the step of block 1500 may be performed more accurately by determining the local ground speed St of each conveyor 100 along the toolbar 12. Such embodiments are described herein in the section entitled "Conveyor Ground Speed Determination."

Continuing to refer to FIG. 7 and process 1100, at block 1117 the planter monitor 1005 preferably determines a conveyor motor speed command, e.g., using a calibration curve. The calibration curve preferably relates the ground speed St to a desired operational speed So. It should be appreciated in light of the instant disclosure that the calibration curve could also relate a criterion related to ground speed (such as a measured voltage or commanded voltage) to a criterion related to a desired conveyor speed (such as a measured voltage or commanded voltage).

Continuing to refer to FIG. 7 and the process 1100, at block 1120 the planter monitor 1005 preferably commands the new desired conveyor speed. It should be appreciated in light of the instant disclosure that the change in conveyor speed command may be deferred until the actual conveyor speed is outside of a preferred range, e.g. 5%, with respect to the desired conveyor speed.

Figure 9:
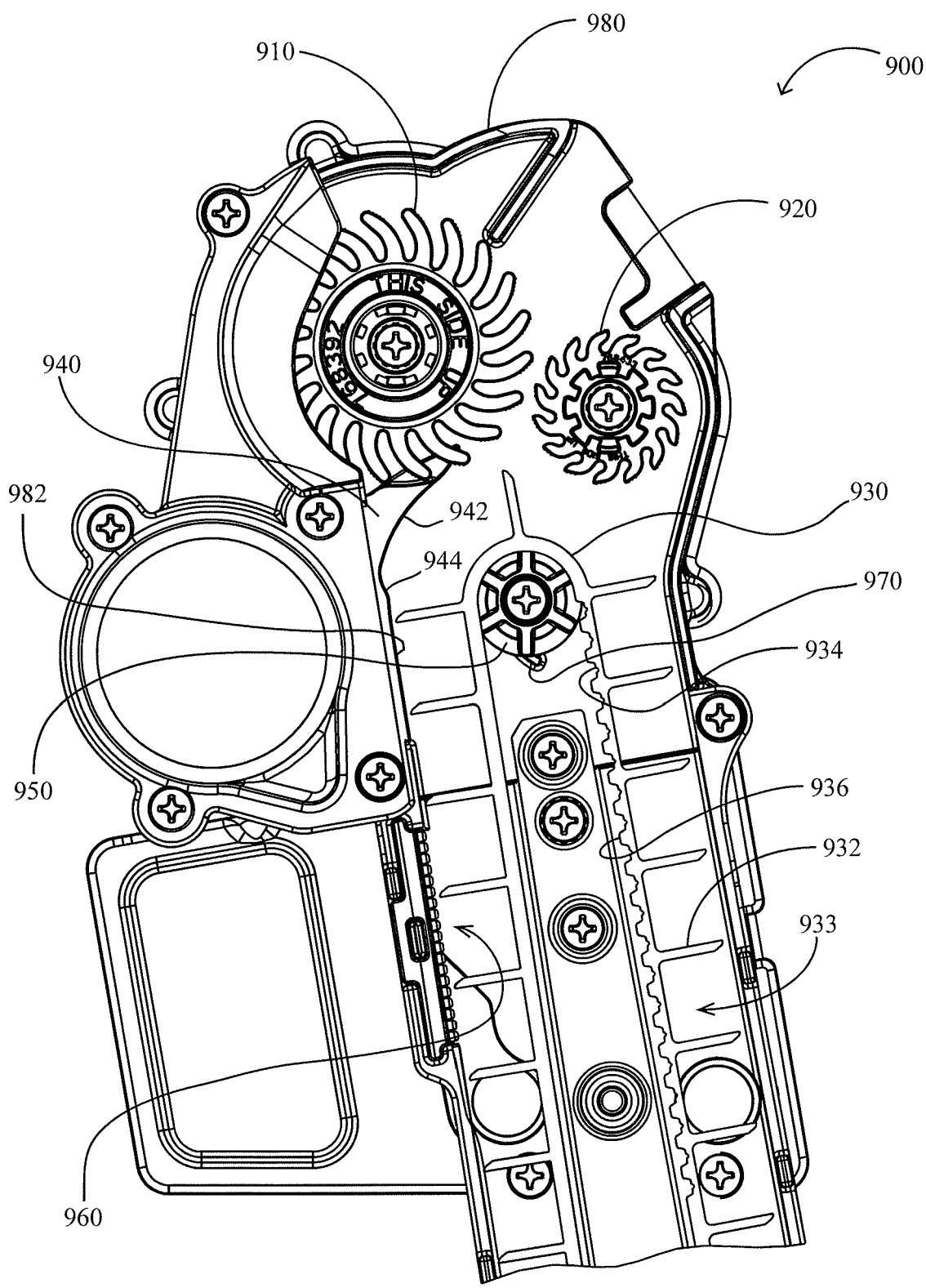
FIG. 9 is a side elevation view of another embodiment of a seed conveyor.
Figure 10:
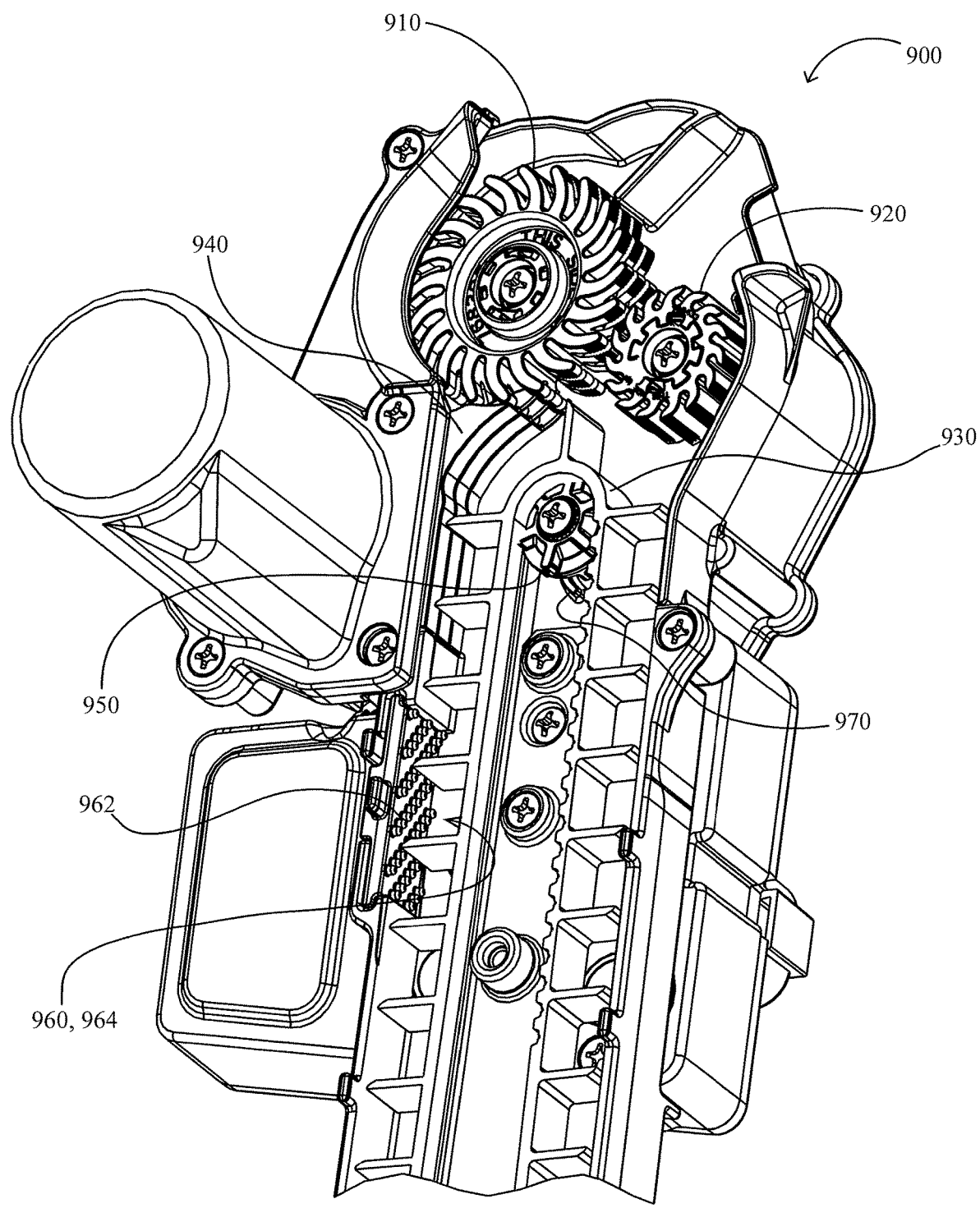
FIG. 10 is a perspective view of the seed conveyor of FIG. 9 in accordance with one embodiment.
Figure 13:
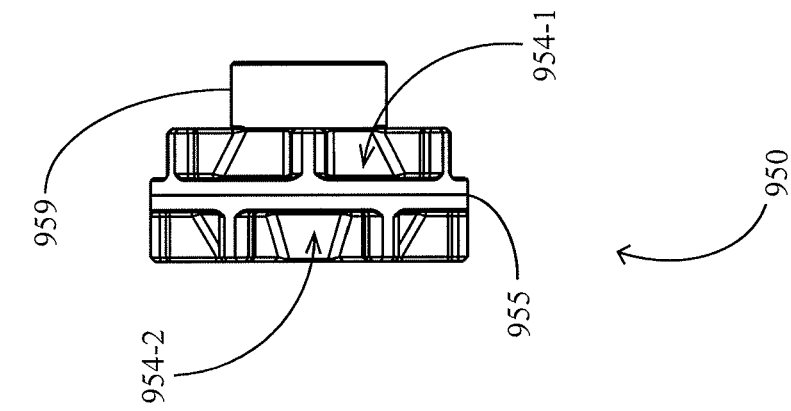
FIG. 13 is a front elevation view of the pulley of FIG. 11 in accordance with one embodiment.
Figure 12:
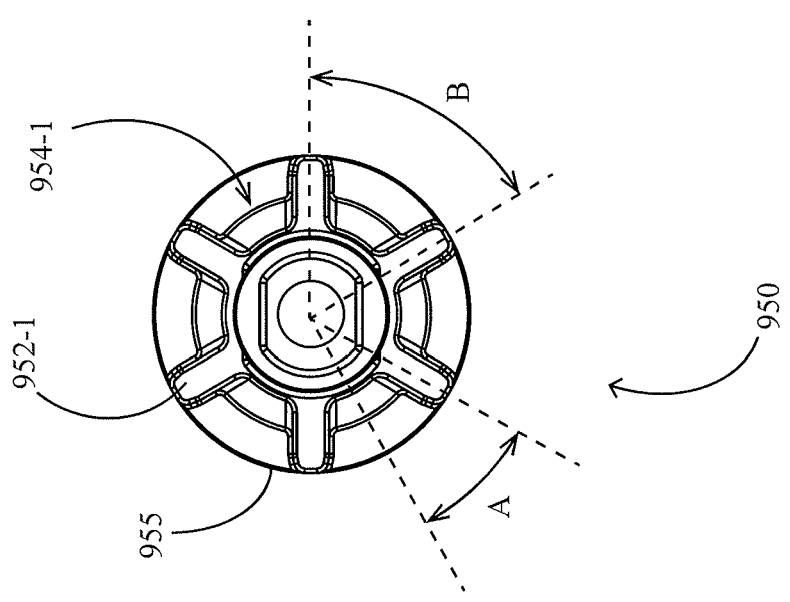
FIG. 12 is a side elevation view of the pulley of FIG. 11 in accordance with one embodiment.

Turning to FIGS. 9-10, another embodiment of a seed conveyor assembly 900 is illustrated. As with the loading conveyor embodiments disclosed in Applicant's International Patent Publication No. WO2013/049198, hereby incorporated by reference herein in its entirety, loading wheels 910, 920 are driven in opposing directions in order to grasp seeds from the seed disc of the seed meter and eject the seeds between flights 932 of a conveyor 930 (e.g., an endless conveyor) housed within a housing 980. In the illustrated embodiment, the conveyor 930 comprises a flighted belt as illustrated in FIGS. 9-10. In other embodiments, the conveyor 930 may comprise other structure suited to convey seeds from an upper to lower position such as a brush belt having a plurality of bristles for receiving seeds.

Figure 11:
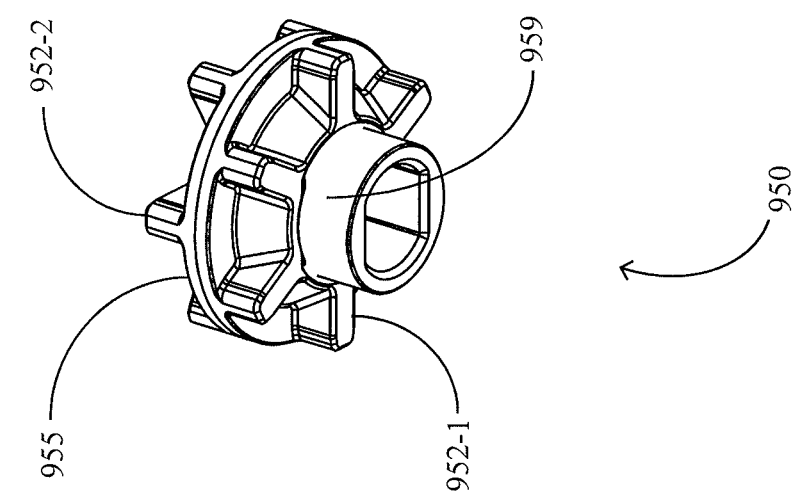
FIG. 11 is a perspective view of an embodiment of a pulley.

FIGS. 9 and 10 likewise illustrate an upper pulley 950 about which the conveyor 930 is driven in operation. A cleaning strip 970 is preferably disposed adjacent (e.g., directly axially adjacent) to the upper pulley 950. The cleaning strip 970 preferably extends radially outwardly from the pulley 950. The cleaning strip 970 is preferably arcuate. The cleaning strip 970 preferably extends arcuately forwardly along the direction of rotation of the pulley 950 (e.g., counter-clockwise on the view of FIG. 9). An upper end of the cleaning strip 970 is preferably adjacent to a radially outer surface of a hub portion 959 (FIG. 11) of the pulley 950. In operation, mud or other debris is preferably scraped from the pulley 950 by contact with the cleaning strip 970 as the pulley rotates adjacent to the cleaning strip 970.

Continuing to refer to FIGS. 9-10, an agitation strip 960 is illustrated. The agitation strip 960 is preferably substantially parallel with (and preferably substantially flush with) an interior wall 982 of the housing 980. The agitation strip 960 preferably includes a plurality of agitation elements 962 which may be arranged in rows 964 (e.g., diagonally-oriented rows as illustrated in FIG. 10). The agitation strip 960 is preferably disposed adjacent to a portion of the conveyor 930 in which seeds are conveyed, e.g., between an entry point at which seeds are introduced by the loading wheels 910, 920 and a release point at which seeds are released from the conveyor into a planting trench. The agitation strip 960 is preferably disposed adjacent to a portion of the conveyor 930 in which seeds are conveyed prior to being sensed by a seed sensor, e.g., between the entry point at which seeds are introduced by the loading wheels 910, 920 and a sensing point at which seeds are detected by a seed sensor. The agitation elements 962 preferably extend toward the conveyor 930. A distal end of each agitation element 962 is preferably directly adjacent to a distal end of the passing flights 932.

In operation, a seed may occasionally become trapped between the distal end of a flight 932 and an interior wall 982 of the housing 980 after being introduced into the conveyor 930. As the trapped seed is dragged along the interior wall 982, the trapped seed is preferably moved toward and across the surface of the agitation strip 960. Upon making contact with the agitation elements of the agitation strip 960, the trapped seed is preferably agitated (e.g., vibrated, moved) and dislocated from between the flight 932 and the interior wall 982. After being dislocated from between the flight and the interior wall, a partially vertically upward force between the seed and one or more agitation elements preferably urges the seed into one of the flight gaps 933 between the flights of the conveyor 930, preferably the flight gap directly vertically above the flight that had trapped the seed.

The agitation strip 960 preferably comprises an elastic material (e.g., rubber, polyurethane). The agitation strip 960 is preferably removable, preferably without the use of tools. The agitation strip 960 may be replaced with a one of a plurality of replacement agitation strips. Each replacement agitation strip may differ from the other replacement agitation strips in one or more of the following criteria: (1) agitation element height, (2) agitation element shape, (3) agitation element number, (4) configuration (e.g., pattern) of agitation elements, or (5) material type or properties (e.g., elasticity).

Referring to FIGS. 9-10, a seed guide 940 is illustrated having a relief portion 942 and an introduction portion 944. The relief portion 942 is preferably disposed radially farther from the pulley 950 (and preferably farther from the conveyor 930) than the introduction portion 944. The relief portion 942 is preferably arcuate, and preferably extends arcuately along a path substantially parallel to the path of a flight 932 passing the relief portion in operation of the conveyor 930. In operation, seeds may slide along the relief portion 942 before contacting the introduction portion 944. Upon contacting the introduction portion 944, the seed is preferably translated (e.g., bumped, urged, forced) in a direction toward the conveyor 930 and is preferably introduced into a flight gap 933 by contact with the introduction portion 944.

Referring to FIGS. 9-13, an improved upper pulley 950 is illustrated in cooperation with the conveyor 930 for driving the conveyor in operation. The pulley 950 preferably includes a first set of radially arranged pulley teeth 952-1 and a second set of radially arranged pulley teeth 952-2. The pulley teeth 952-1 are preferably separated by a pitch angle B (e.g., 60 degrees). The pulley teeth 952-2 are preferably separated by the same pitch angle B (e.g., 60 degrees). The first set of drive teeth 952-1 and the second set of drive teeth 952-2 are preferably offset from one another by an angular offset A. The angular offset A is preferably one-half of the angular pitch B (e.g., 30 degrees). The first and second sets of pulley teeth are preferably laterally offset by a rim 955.

In operation, the pulley teeth 952 preferably engage belt gaps 934 disposed between belt teeth 936 to drive the conveyor 930 about the pulley 950. The belt gaps 934 are preferably spaced such that sequential belt gaps 934 along the conveyor 930 are alternatingly engaged by pulley teeth 952-1 and 952-2. For example, in one embodiment the following steps may take place in chronological order during operation: a first belt gap 934 is engaged by a first pulley tooth of the pulley tooth set 952-1, then a second belt gap 934 (e.g., the next belt gap following the first belt gap) is engaged by a first pulley tooth of the pulley tooth set 952-2, then a third belt gap 934 (e.g., the next belt gap following the second belt gap) is engaged by a second pulley tooth of the pulley tooth set 952-1, then a fourth belt gap 934 (e.g., the next belt gap following third belt gap) is engaged by a second pulley tooth of the pulley tooth set 952-2, and so-on. In operation, pulley gaps 954-1 and 954-2 between the two sets of pulley teeth 952-1, 952-2 are similarly alternatingly engaged (e.g., non-drivingly engaged) by belt teeth 936. In operation, the rim 955 is preferably partially received in a longitudinal slot (not shown) provided along the inner side of the conveyor 930 a laterally central position along the length of the conveyor. It should be appreciated that although the pattern of belt teeth 936 and belt gaps 934 are illustrated only along the right hand side of the conveyor 930 (see FIG. 9), in preferred embodiments this pattern continues along the length of the conveyor.

Figure 14:
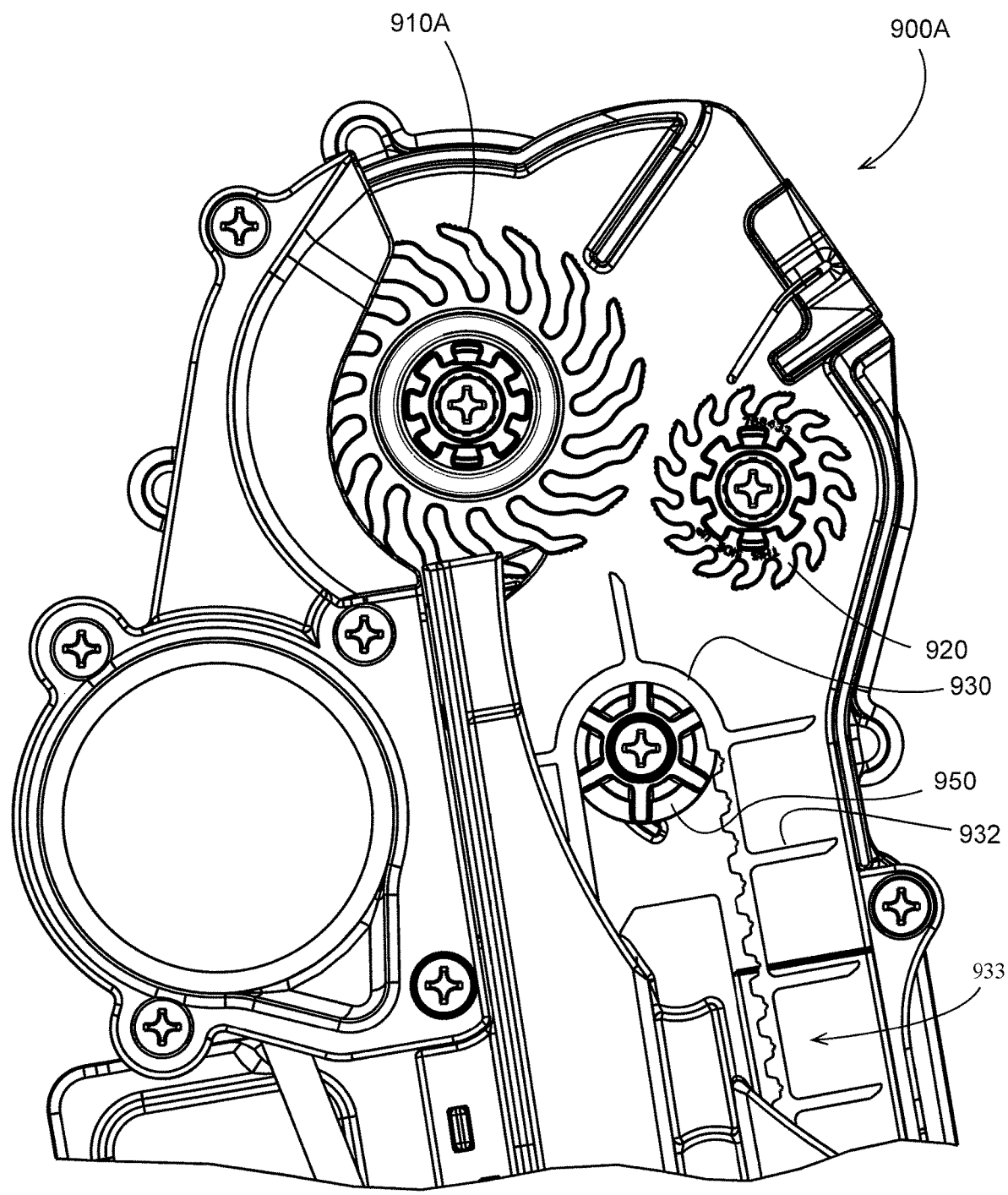
FIG. 14 is a side elevation view of another embodiment of a seed conveyor showing an alternative embodiment loading wheel with sinusoidal fingers.
Figure 15:
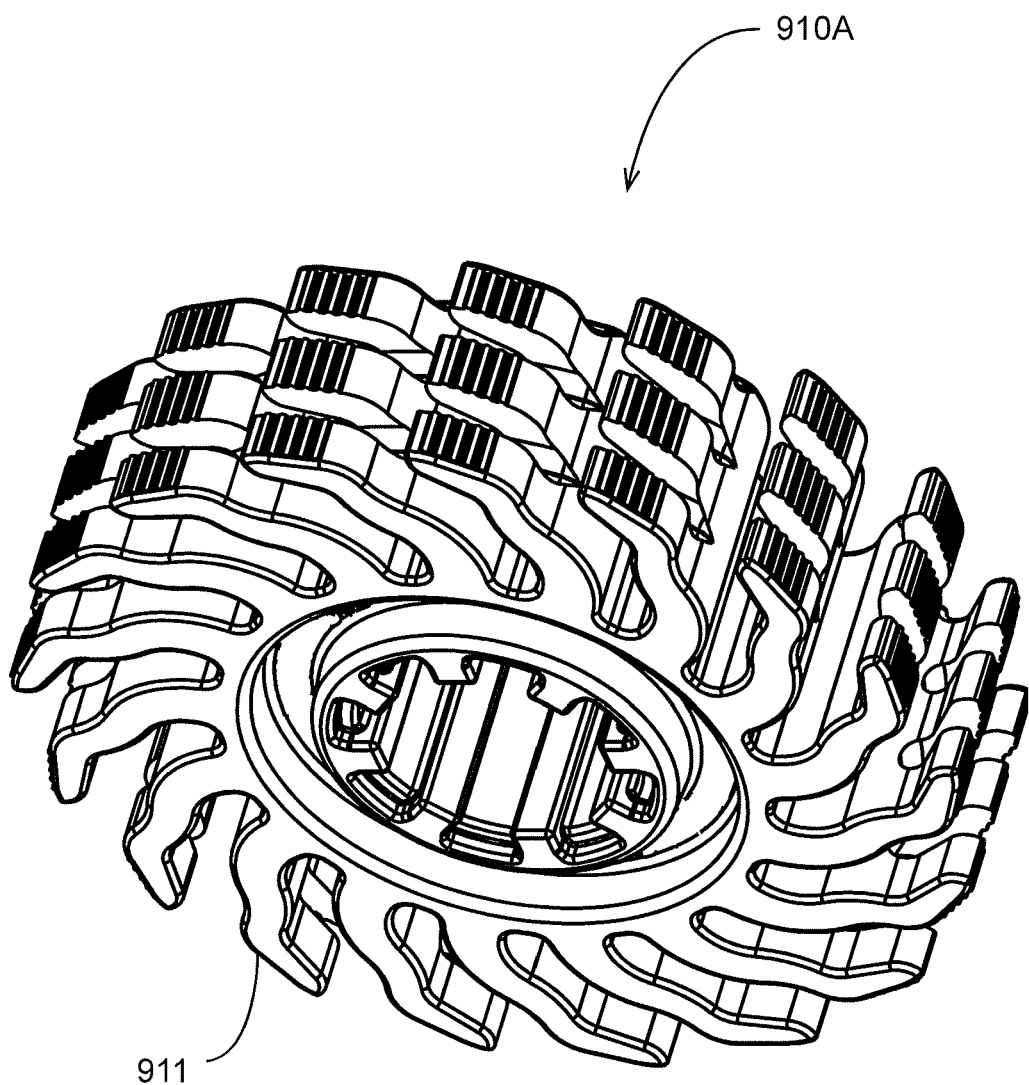
FIG. 15 is a perspective view of the loading wheel with sinusoidal fingers of FIG. 14 in accordance with one embodiment.
Figure 17:
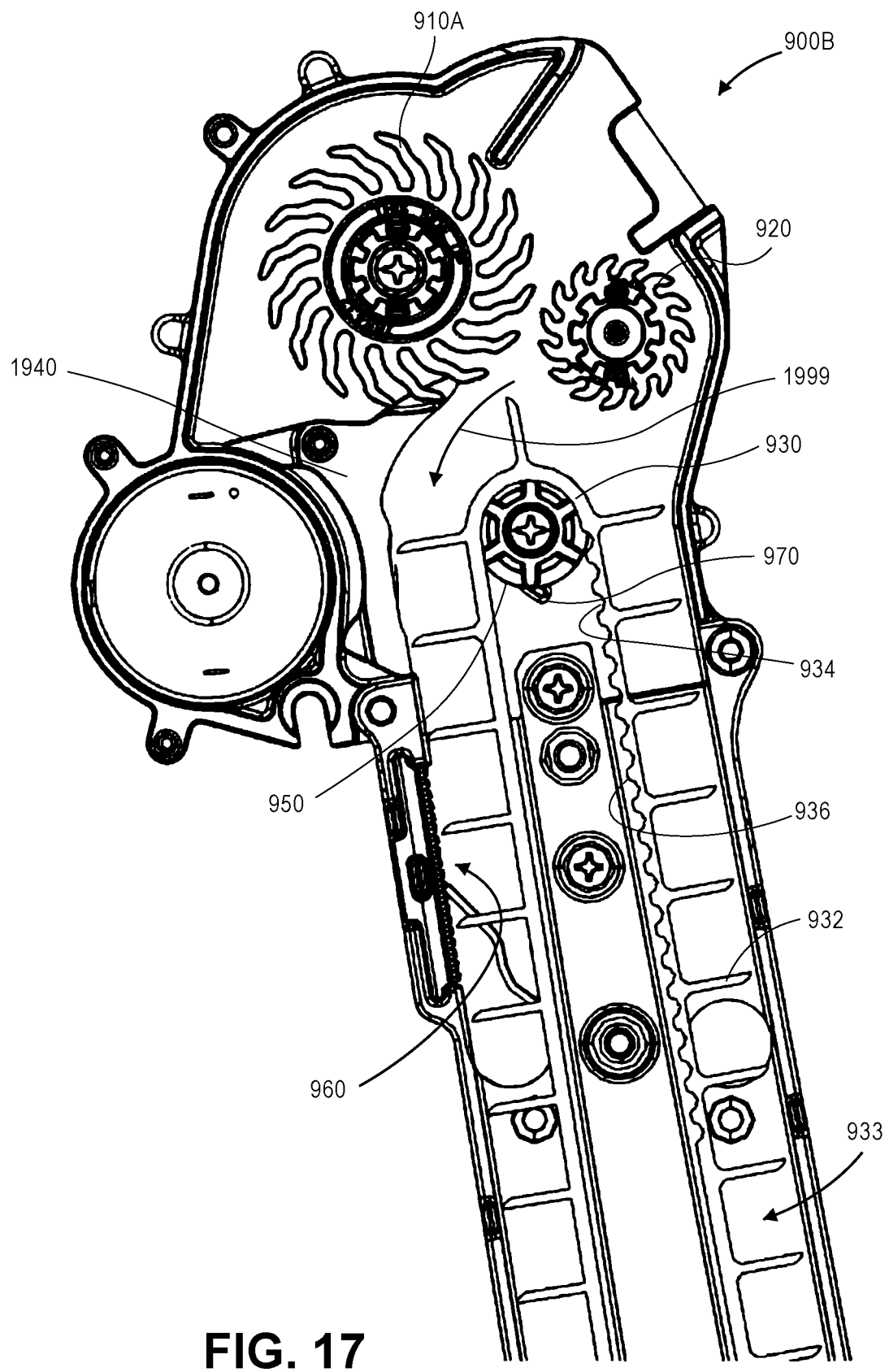
FIG. 17 is a side elevation view of another embodiment of a seed conveyor.
Figure 18A:
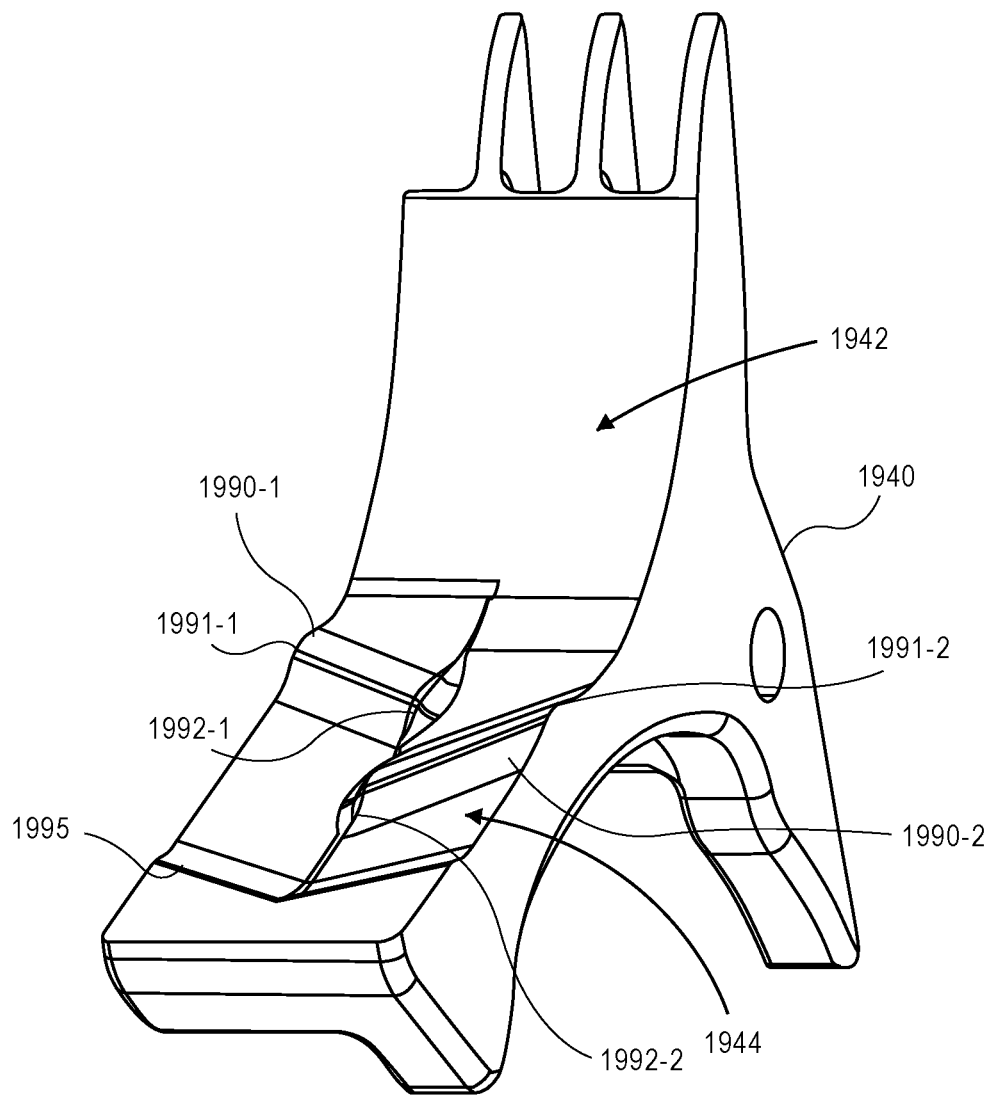
FIG. 18A is a perspective view of a seed guide viewed from the bottom right corner in accordance with one embodiment.
Figure 18B:
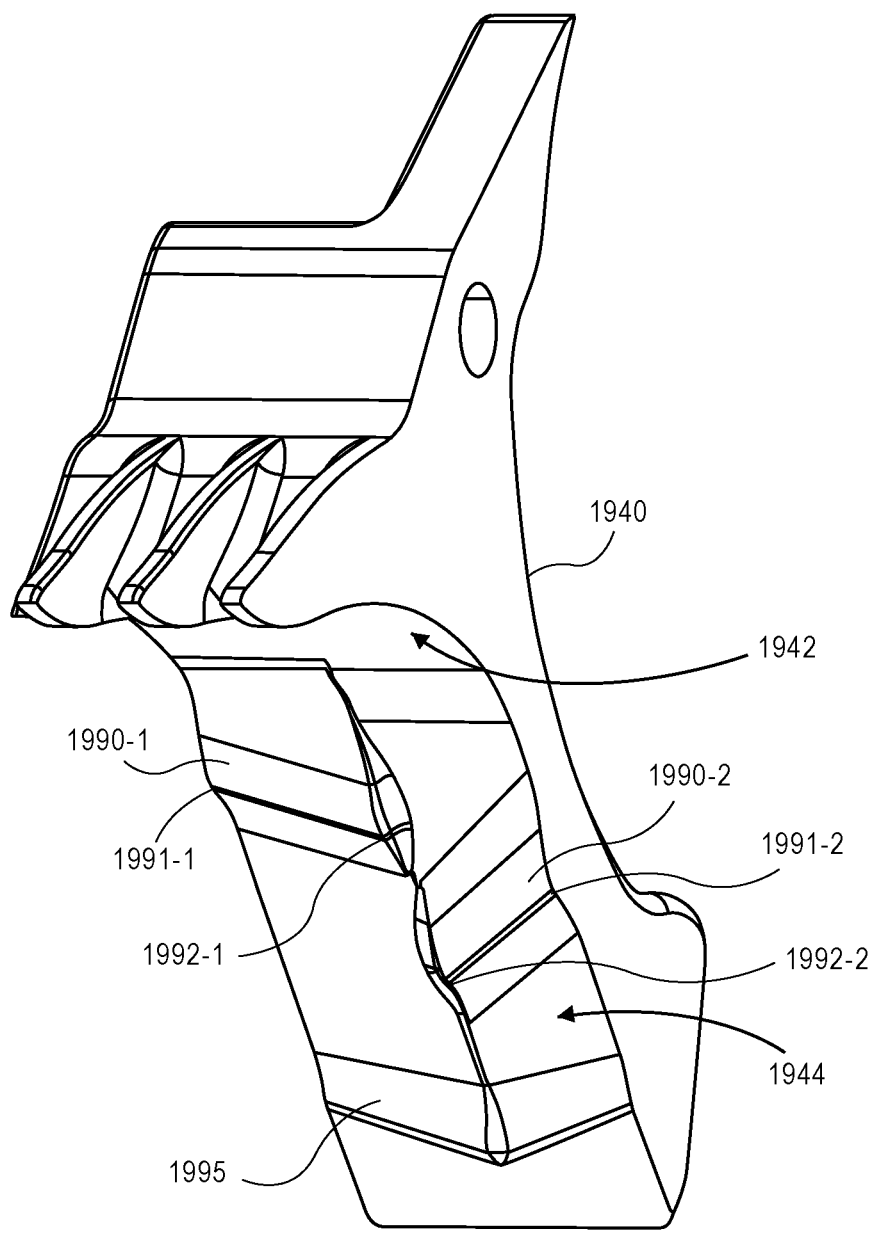
FIG. 18B is a perspective view of the seed guide of FIG. 18A viewed from the top right corner in accordance with one embodiment.
Figure 19:
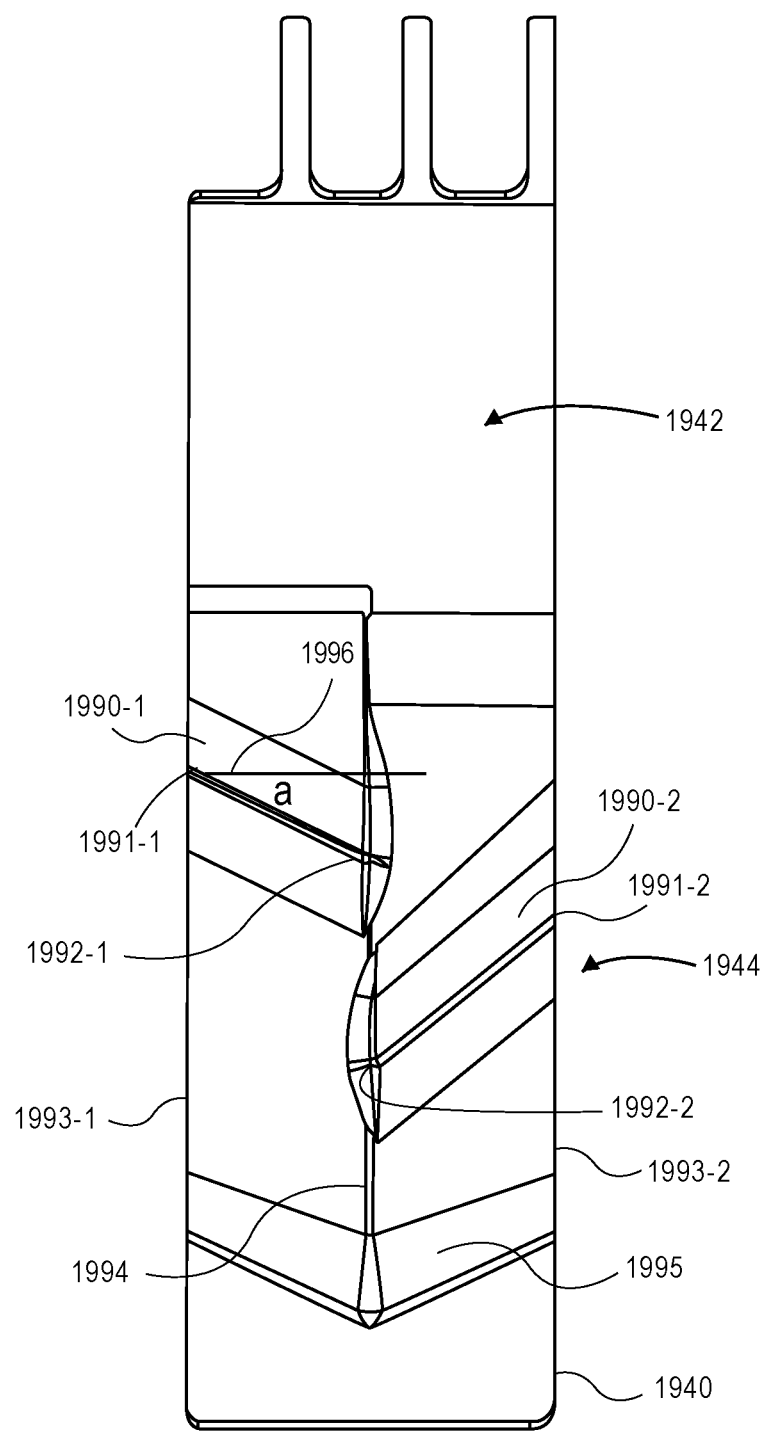
FIG. 19 is a front elevation view of the seed guide of FIG. 18A in accordance with one embodiment.
Figure 20:
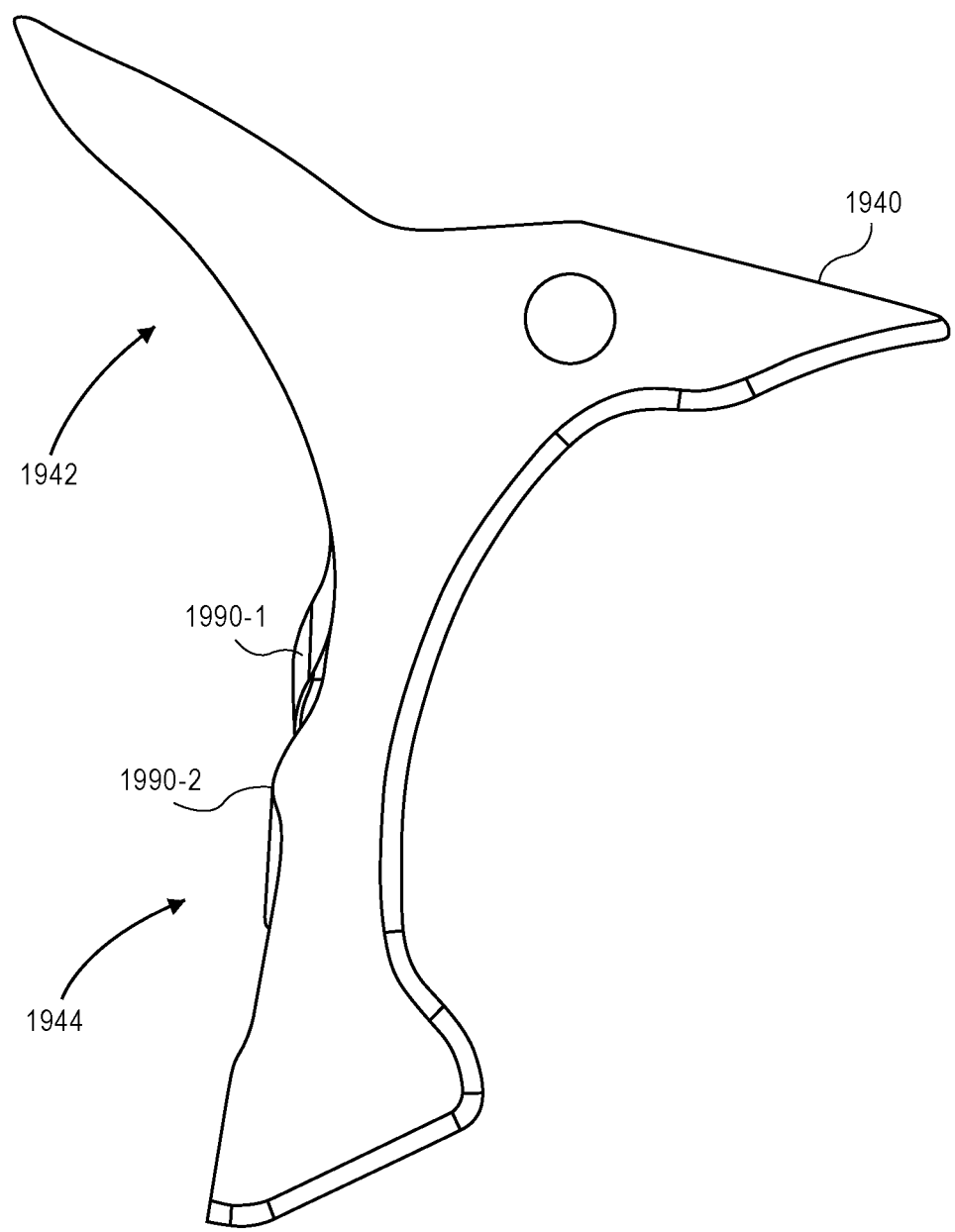
FIG. 20 is a right elevation view of the seed guide of FIG. 18A in accordance with one embodiment.

FIG. 14 is a side elevation view of another embodiment of a seed conveyor 900A which is substantially the same as in the previous embodiment of the seed conveyor 900 shown in FIG. 9, except that in the embodiment of FIG. 14, the seed conveyor 900A utilizes a loading wheel 910A having sinusoidal shaped fingers 911 as best shown in FIG. 15. The sinusoidal shape of the fingers 911 allows for more compression of the fingers 911 when there are larger seeds thereby minimizing potential clogging of the loading wheel 900A. In another embodiment, seed guide 940 is replaced with seed guide 1940. FIG. 17 is a side elevation view of a seed conveyor assembly 900B showing seed guide 1940. Seed travel in a direction of travel 1999 from loading wheel 910A toward agitation strip 960. Referring to FIGS. 18A to 20, seed guide 1940 is illustrated having a relief portion 1942 and an introduction portion 1944. The relief portion 1942 is preferably disposed radially farther from the pulley 950 (and preferably farther from the conveyor 930) than the introduction portion 1944. The relief portion 1942 is preferably arcuate, and preferably extends arcuately along a path substantially parallel to the path of a flight 932 passing the relief portion in operation of the conveyor 930. In operation, seeds may slide along the relief portion 1942 before contacting the introduction portion 1944. Upon contacting the introduction portion 1944, the seed is preferably translated (e.g., bumped, urged, forced) in a direction toward the conveyor 930 and is preferably introduced into a flight gap 933 by contact with the introduction portion 1944.

Introduction portion 1944 has a first protrusion 1990-1 and optionally a second protrusion 1990-2. Additional protrusions can be added. Each protrusion 1990-1 and 1990-2 has a first end 1991-1 and 1991-2, respectively, and a second end 1992-1 and 1992-2, respectively. Protrusions 1990-1 and 1990-2 are angled with respect to the direction of travel 1999 such that protrusions 1990-1 and 1990-2 are not oriented transverse to the direction of travel 1999. First ends 1991-1 and 1991-2 are disposed in the introduction portion 1944 before second ends 1992-1 and 1992-2. As viewed in FIG. 19, protrusions 1990-1 and 1990-2 are angled down from the sides 1993-1 and 1993-2 of introduction portion 1944 to the center 1994 of introduction portion 1944. In certain embodiments, second ends 1992-1 and 1992-2 are located near center 1994. In certain embodiments, a protrusion angle 'a' formed between a transverse line 1996 and protrusion 1990-1 or 1990-2 is greater than 0° up to 80°. In other embodiments, the protrusion angle 'a' is 30° to 60°, and in other embodiments the protrusion angle 'a' is 40° to 50° or 45°. In one embodiment, protrusions 1990-1 and 1990-2 have an arcuate shape. In another embodiment, a ramp 1995 is disposed after protrusion 1990-1 and all optional protrusions in the direction of travel 1999 in introduction portion 1944. Ramp 1995 helps guide seeds into flight gap 933.

The foregoing disclosure is meant to be illustrative and is not intended to be exhaustive or limited to the embodiments, systems and methods described herein. Many modifications and variations will be apparent to those of ordinary skill in the art without departing from the teachings provided. It is intended that the foregoing disclosure, including the claims, be interpreted to embrace all such variations and modifications.

What is claimed is:

1. A seed guide for a seed tube, the seed guide comprising:
a relief portion having a seed guide surface to extend from a first side of the seed guide to a second side of the seed guide to receive and guide seed; and
an introduction portion formed adjacent to the relief portion, wherein the introduction portion comprises a seed guide surface for contacting seed that extends from the first side of the seed guide across a width of the seed guide to the second side of the seed guide, wherein the seed guide surface of the introduction portion includes at least one protrusion having first and second ends to protrude from the seed guide surface of the introduction portion with the first end abutting the first side of the seed guide and the second end facing and abutting a centerline of the introduction portion of the seed guide, and the protrusion is angled to protrude from the first end toward the center of the seed guide with the second end of the protrusion proximate the center of the seed guide and being further from an edge of the seed guide surface of the relief portion than the first end, wherein the protrusion is arcuately shaped to provide an arcuate shape to the seed guide surface of the introduction portion,
wherein the seed guide is configured to guide seeds into the seed tube.

2. The seed guide of claim 1 wherein the relief portion is arcuate and extends arcuately along a path that is substantially parallel to a flight path of seed passing the relief portion in operation of the seed tube.

3. The seed guide of claim 1, wherein the at least one protrusion comprises a first protrusion and a second protrusion that are each angled with respect to a direction of travel of the seed such that each protrusion is not oriented transverse to the direction of travel of the seed, wherein the first protrusion is disposed and offset above the second protrusion on the introduction portion.

4. The seed guide of claim 1 wherein a protrusion angle formed between a transverse line and the protrusion is greater than 0° up to 80°.

5. The seed guide of claim 1 wherein a protrusion angle formed between a transverse line and the protrusion is approximately 30° to 60°.

6. The seed guide of claim 1 wherein a protrusion angle formed between a transverse line and the protrusion is approximately 40° to 50°.

7. The seed guide of claim 1 wherein the protrusion has an arcuate shape across the width of the seed guide.

8. A seed guide for a seed conveyor assembly, the seed guide comprising:
a relief portion having a seed guide surface to extend from a first side of the seed guide to a second side of the seed guide; and
an introduction portion formed adjacent to the relief portion, the introduction portion comprises a seed guide surface for contacting seed that extends from the first side of the seed guide across a width of the seed guide to the second side of the seed guide, wherein the seed guide surface of the introduction portion includes a first protrusion having first and second ends to protrude from the seed guide surface of the introduction portion with the first end abutting the first side of the seed guide and the second end abutting proximate a center of the seed guide, and the first protrusion is angled to protrude from the first end to proximate the center of the seed guide with the second end of the first protrusion proximate the center of the seed guide, wherein the first protrusion is arcuately shaped to provide an arcuate shape to the seed guide surface of the introduction portion, wherein the seed guide is configured to guide seeds into a rotatable conveyor of the seed conveyor assembly, wherein the relief portion is arcuate and disposed radially farther from the rotatable conveyor than the introduction portion in operation of the seed conveyor assembly.

9. The seed guide of claim 8 further comprising:
a second protrusion having first and second ends, the second protrusion is angled from the second side of the seed guide toward the center of the seed guide with the second end of the second protrusion proximate the center of the seed guide.

10. The seed guide of claim 9 wherein the first and second protrusion are each angled with respect to a direction of travel of the seed such that each protrusion is not oriented transverse to the direction of travel of the seed, wherein the first protrusion is disposed and offset above the second protrusion on the introduction portion and the second end of the first protrusion faces and abuts a centerline of the introduction portion.

11. The seed guide of claim 9 wherein the first protrusion angles down from the first side of the seed guide to the center of the seed guide and the second protrusion angles down from the second side of the seed guide to the center of the seed guide.

12. The seed guide of claim 9 wherein each protrusion has a protrusion angle formed between a transverse line and the protrusion that is 30° to 60°.

13. The seed guide of claim 9 wherein each protrusion has a protrusion angle formed between a transverse line and the protrusion that is approximately 40° to 50°.

14. The seed guide of claim 9 wherein the introduction portion further comprises a ramp that is disposed after the first and second protrusions in the direction of travel of the seed to guide seed into a flight gap of the seed conveyor assembly.

15. A seed conveyor assembly to deliver seed to a planting surface, comprising:
- a conveyor configured to rotate to convey seed from an upper end to a lower end of the seed conveyor assembly and release the seed with a rearward velocity relative to the seed conveyor assembly; and
- a seed guide having a relief portion having a seed guide surface to extend from a first side of the seed guide to a second side of the seed guide to receive and guide seed and an introduction portion to translate seed in a direction toward the conveyor, the introduction portion comprises a seed guide surface for contacting seed that extends from the first side of the seed guide across a width of the seed guide to the second side of the seed guide, wherein the seed guide surface of the introduction portion includes at least one protrusion having first and second ends to protrude from the seed guide surface of the introduction portion with the first end abutting the first side of the seed guide and the second end abutting proximate a center of the seed guide, and the protrusion is angled to protrude from the first end toward the center of the seed guide with the second end of the protrusion proximate the center of the seed guide and being further from an edge of the seed guide surface of the relief portion than the first end,
- wherein the seed guide is configured to guide seeds into the conveyor of the seed conveyor assembly.

16. The seed conveyor assembly of claim 15 wherein the protrusion angles down from the first side of the seed guide to the center of the seed guide.

17. The seed conveyor assembly of claim 15 wherein a protrusion angle formed between a transverse line and the protrusion is 30° to 60°.

18. The seed conveyor assembly of claim 15 wherein the conveyor is configured to rotate to convey seed from the upper end to the lower end of the seed conveyor assembly with a constrained seed path and the introduction portion is configured to introduce seed into a flight gap of the conveyor.

* * * * *